May 4, 1965 K. P. MUELLER 3,181,425
PRESSURE ACTUATED CONTROL DEVICE
Filed Nov. 13, 1962 4 Sheets-Sheet 1

INVENTOR.
KLAUS P. MUELLER
BY Mead, Browne, Schuyler & Beveridge
ATTORNEYS.

INVENTOR.
KLAUS P. MUELLER
BY
Mead, Browne, Schuyler, & Beveridge
ATTORNEYS.

May 4, 1965 K. P. MUELLER 3,181,425
PRESSURE ACTUATED CONTROL DEVICE
Filed Nov. 13, 1962 4 Sheets-Sheet 3

INVENTOR.
KLAUS P. MUELLER
BY
Mead, Browne, Schuyler & Beveridge
ATTORNEYS.

May 4, 1965  K. P. MUELLER  3,181,425
PRESSURE ACTUATED CONTROL DEVICE
Filed Nov. 13, 1962  4 Sheets-Sheet 4

INVENTOR.
KLAUS P. MUELLER
BY
Browne, Schuyler, & Beveridge
ATTORNEYS.

United States Patent Office 3,181,425
Patented May 4, 1965

3,181,425
PRESSURE ACTUATED CONTROL DEVICE
Klaus Petro Mueller, Goshen, Ind., assignor to Robertshaw Controls Company, a corporation of Delaware
Filed Nov. 13, 1962, Ser. No. 236,888
15 Claims. (Cl. 91—25)

This invention relates to actuators for control devices and is particularly concerned with pressure responsive actuators for maintaining a switch, valve or other control device in a particular operating condition between low and high limit values of a signal pressure. This application is a continuation-in-part of copending application Serial No. 181,607 filed March 22, 1962, now abandoned.

An object of this invention is to actuate a control device having a movable actuating member with a variable signal pressure in such a manner that the actuating member is moved to one operating position when the signal pressure is between low and high limit values and moves to a second operating position when the signal pressure is less than the low limit value.

A further object lies in the provision of a pressure responsive actuator having a movable operating member in which the operating member is snap actuated to one operating position when the signal pressure exceeds a high limit value and remains in the one operating position until the signal pressure decreases below a low limit value, whereupon the operating member is returned to its original position with a snap action.

Another object is to snap actuate a control device having a movable actuating arm in response to a variable signal pressure and to insure proper operation upon rapid fluctuations in the signal pressure.

Another object is to provide a fluid pressure actuator for actuating a control device in response to selected minimum and maximum pressure variations which will insure snap actuation of the control device during rapid fluctuations in pressure over wide ranges.

Another object is to provide a fluid pressure actuator of simplified construction and having a minimum number of parts, resulting in more economical production and efficiency of operation than is possible in the prior art.

The foregoing, and other objects are accomplished by the provision of a low limit chamber, a high limit chamber, and an operating chamber, each having a pressure responsive wall operable to expand and contract the chambers. In communication with the low limit chamber is an exhaust chamber which in turn is connected through ports or passages with the high limit and operating chambers.

Valve mechanism is mounted in the exhaust chamber which operates in response to contraction of the low limit chamber to connect the exhaust chamber with atmosphere, and which operates upon expansion of the low limit chamber to disconnect the exhaust chamber from atmosphere and connect the low limit chamber with the ports. When the low limit chamber expands, fluid pressure is transmitted directly to the high limit chamber from the low limit chamber, while the port connecting the low limit and operating chambers is controlled by the movable wall of the operating chamber. Communication between the high limit chamber and the operating chamber is provided by a port controlled by the movable wall of the high limit chamber.

For determining the minimum and maximum limits of the signal pressure at which the operating chamber will be expanded to operate an actuating member of a switch, valve, or other control device, adjustable springs engage the movable walls of the low and high limit chambers biasing the chambers to their contracted positions, with the biasing force on the high limit chamber preferably greater than that on the low limit chamber. However, the actuator may be designed so that with identical biasing forces on the low and high limit chambers, a differential pressure of one p.s.i. in the signal pressure will be required to expand the high limit chamber after expansion of the low limit chamber.

When it is desired to control a variable condition in accordance with selected minimum and maximum values of the signal pressure, the actuating arm of a control device is operatively secured to the movable wall of the operating chamber and a variable signal pressure is introduced to the low limit chamber. The minimum and maximum values are selected by adjustment of the springs on the movable walls of the low and high limit chambers, respectively. As the signal pressure increases beyond the minimum, or low limit values, the valve mechanism connects the low limit chamber to the high limit chamber. As the signal pressure increases above the high limit value, the high limit chamber expands, connecting the high limit chamber with the operating chamber, whereupon the operating chamber begins to expand, opening the port between the low limit chamber and the operating chamber. As soon as the latter port is opened, the operating chamber, being subjected simultaneously to the pressure from both the low and high limit chamber, expands with a snap action.

As the signal pressure subsequenty decreases to less than the high limit value, the high limit chamber contracts shutting off communication between the high limit and operating chamber, but the operating chamber remains in its expanded condition due to its communication with the low limit chamber. A further decrease in the signal pressure to less than the low limit value causes the low limit chamber to contract and exhaust the chambers to atmosphere. To prevent pressure from being trapped between the operating chamber and high limit chamber when the operating chamber contracts, a bleed port is provided in the movable wall of the operating chamber which opens when the chamber is contracted and which is closed by a resilient bleed valve when the chamber expands.

Further objects and advantages will become apparent from the following description taken in connection with the accompanying drawings in which.

Figure 1:
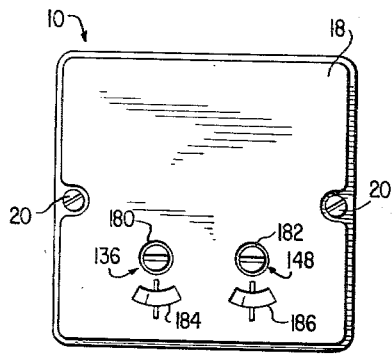
FIG. 1 is a plan view of a pressure actuated switch embodying one form of the invention.

FIGS. 1 through 4 illustrate a housing 10 having side walls 12 and a bottom wall 14. Side walls 12 are provided with a laterally extending peripheral flange 16 at their upper ends for receiving a cover member 18 which is secured to flange 16 by conventional screws 20 (FIG. 1). Cover member 18 is removed fro mthe control in FIGS. 2 and 4.

Secured to opposite side of bottom wall 14 by a plurality of conventional screws 22 is a top plate member 24 and a base plate 26. Top plate 24 and bottom wall 14 are provided with cooperating depressions forming compartments 28, 30 and 32. Mounted between plate 24 and wall 14 is a flexible gasket member 34 of resilient material which provides a fluid tight seal between top plate 24 and wall 14. Secured between base member 24 and bottom wall 14 is a second resilient gasket 36 to provide a fluid tight seal between members 26 and 14.

Gasket member 34 is formed with diaphragm portions 38, 40 and 42 which extend respectively through compartments 28, 30 and 32. Diaphragms 38, 40 and 42 form movable walls for a low limit chamber 44, a high limit chamber 46 and an operating chamber 48 respectively.

Figure 3:
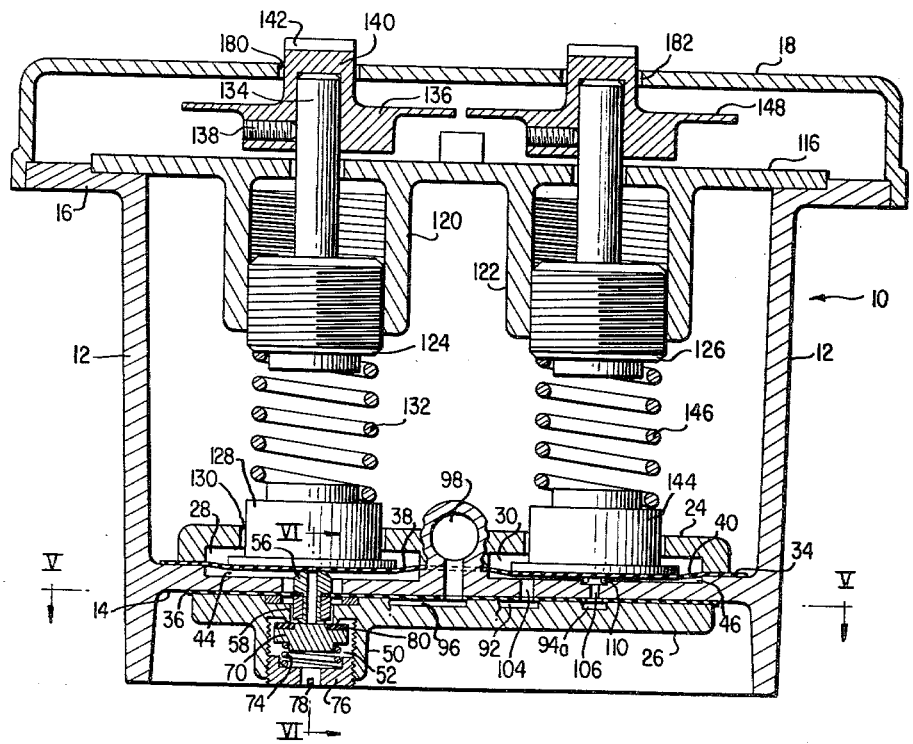
FIG. 3 is a sectional view taken on line 3—3 of FIG. 2.
Figure 6:
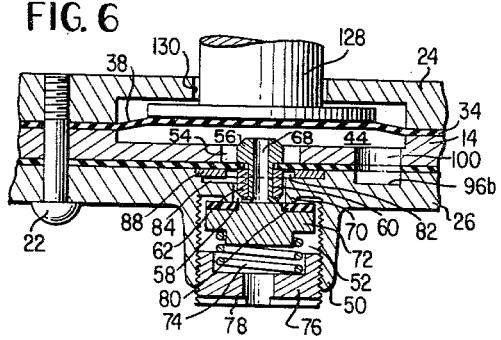
FIG. 6 is a sectional view taken on line 6—6 of FIG. 3.

Extending from the lower side of base member 26 is an internally threaded hollow boss 50 forming an exhaust chamber 52 (FIGS. 3 and 6). Low limit chamber 44 is provided with an outlet port 54 in wall 14, and movably mounted in port 54 is a control valve 56. Control valve 56 extends into an exhaust port 58 formed in the upper wall of exhaust chamber 52, and is flexibly supported by the resilient gasket 36.

Figure 7:
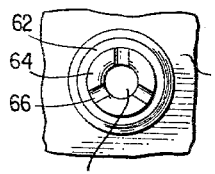
FIG. 7 is an end view of the control valve.

Control valve 56 comprises a flanged stem 60 which projects through an aperture in gasket 36 and receives a sleeve member 62. The lower end portion 64 of stem 60 extends beyond sleeve member 62 and is staked over the sleeve member to secure the parts together and clamp gasket 36 between the flange of stem 60 and sleeve member 62. Formed in end portion 64 of stem 60 (FIG. 7) is a plurality of grooves 66 (in this case three) which communicate with a passage 68 in stem 60 for a purpose to be described below.

Surrounding the lower side of exhaust port 58 is a raised annular exhaust valve seat 70. Fluid flow through exhaust port 58 is controlled by an exhaust valve 72 in the form of a disc which is resiliently mounted in exhaust chamber 52 by a spring 74. Spring 74 has one end seated in a recessed, apertured spring seat member 76 which is threadedly mounted in chamber 52 and is provided with a screwdriver slot 78 for adjusting its position and varying the biasing force of spring 74. Exhaust valve 72 is provided with an annular groove on its upper face for receiving a washer member 80 of resilient material to provide a sealing engagement with valve seat 70 when valve 72 is closed.

Formed in base plate 26 on the opposite side of exhaust chamber 52, is an annular recess 82. Recess 82 is provided with an inclined depressed portion 84 (FIG. 5) with a ledge 86 formed at the junction of the lower end of depressed portion 84 with recess 82. Mounted in recess 82 is an annular washer 88 (FIG. 6), preferably of brass, for supporting the portion of gasket 36 which carries control valve 56. Depressed portion 84 provides a path for flow from passage 68 through groove 66 when exhaust valve 70 is seated against valve seat 70 to close the exhaust port. Diaphragm 38 is movable to contract low limit chamber 44 and, acting through control valve 56, to move exhaust valve 72 to the open position providing communication between low limit chamber 44 and atmosphere.

Figure 4:
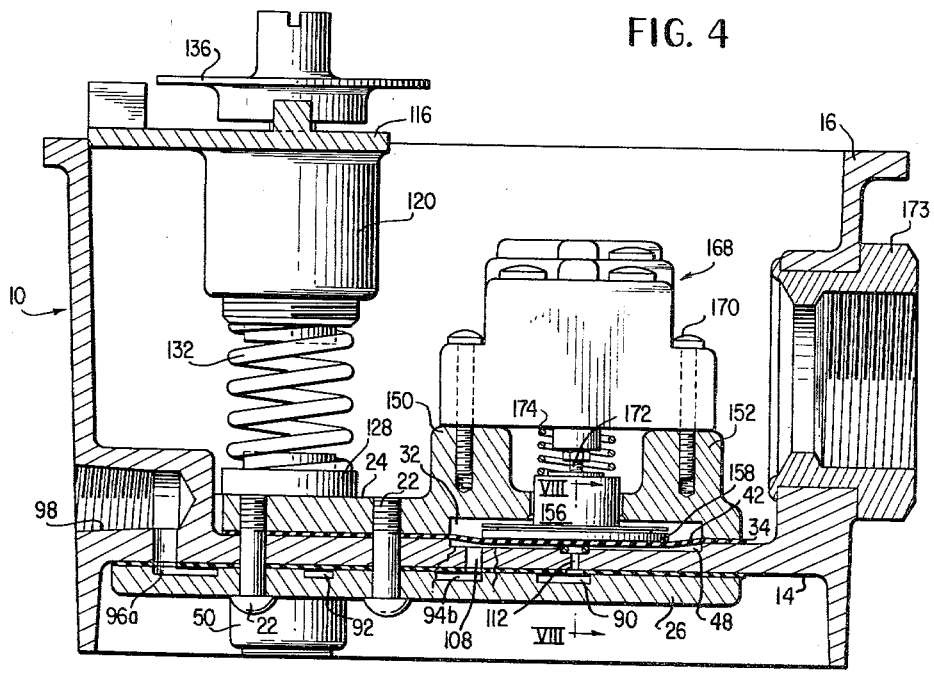
FIG. 4 is a sectional view taken on line 4—4 of FIG. 2.
Figure 5:
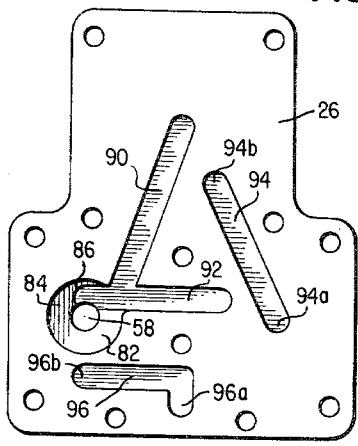
FIG. 5 is a plan view of the base member taken on line 5—5 of FIG. 3.

With refernce to FIG. 5, a plurality of channels 90, 92, 94 and 96 are formed in the upper face of base plate 26 with channels 90 and 92 extending at one end from depression 82. Channel 96 is L-shaped in plan, and one end 96a communicates with an internally threaded signal port 98 formed in housing 10 (FIG. 4), and the other end 96b communicates with an inlet port 100 in low limit chamber 44 (FIG. 6).

Channel 92 extends from recess 82 and communicates with an inlet port 104 in high limit chamber 46 (FIG. 3) to provide a passage for fluid flow from low limit chamber 44.

Channel 94 communicates at one end 94a with a diaphragm controlled outlet port 106 in high limit chamber 46, and at the other end 94b with an inlet port 108 in operating chamber 48 (FIG. 4) to connect high limit chamber 46 with the operating chamber. Port 106 is surrounded by a recess in the lower wall of high limit chamber 46 for receiving an O-ring 110. Port 106 is sealed by engagement of diaphragm 40 with O-ring 110 when high limit chamber 46 is contracted by diaphragm 40.

Channel 90 extends from recess 82 and communicates at its end with a diaphragm controlled port 112 in the lower wall of operating chamber 48 to directly connect low limit chamber 44 with the operating chamber bypassing the high limit chamber. Port 112 is provided with an O-ring 114 (FIG. 8) which is seated in a recess in the lower wall of operating chamber 48. Diaphragm 42 seals port 106 when operating chamber 48 is contracted.

When the signal pressure from signal port 98 is sufficient to expand low limit chamber 44, spring 74 closes exhaust valve 72 and fluid flows from chamber 44 through passage 68 in control valve 56 to channels 90 and 92. Flow from channel 90 through port 112 is prevented when diaphragm 42 is in the contracted position, and flow from high limit chamber 46 through channel 94 is prevented so long as high limit chamber 46 is contracted. When the pressure from channel 92 is sufficient to expand high limit chamber 46, pressure flows from chamber 46 through channel 94 to operating chamber 48 and expands the operating chamber. As soon as diaphragm 42 moves away from port 112, operating chamber 47 is simultaneously subjected to the pressure from channels 90 and 94 causing chamber 48 to rapidly expand with a snap action.

Figure 2:
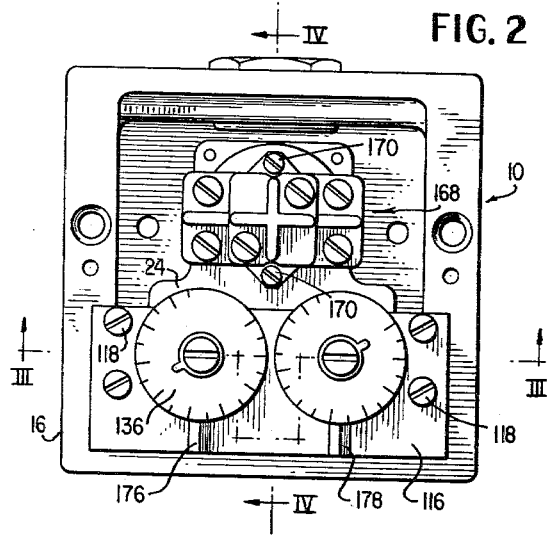
FIG. 2 is an enlarged plan view similar to FIG. 1 with the cover removed.

Referring to FIGS. 2 and 3, a dial plate 116 is mounted in cooperating notches formed in flange 16 and is secured to the flange by conventional screws 118 which extend through cooperating, apertured lugs (not shown) formed on the flange. Extending from the lower side of dial plate 116 is a pair of internally threaded bosses 120 and 122. Threadedly mounted in boss 120 is a low limit adjustment screw 124, and a high limit adjustment screw 126 is threadedly received in boss 122.

Mounted in compartment 28 against the upper side of diaphragm 38 is a flanged pressure plate 128 which extends through an opening 130 in top plate 24. Expansion of low limit chamber 44 is limited by the engagement of the flange of pressure plate 128 with the upper wall of compartment 28 at the periphery of opening 130. For biasing diaphragm 38 to its contracted position, a spring 132 has one end mounted on pressure plate 128 and the other end seated against adjusting screw 124.

Adjusting screw 124 is provided with a stem 134 which extends through an opening in dial plate 116 and a low limit dial 136 is mounted on the upper end of stem 134. Dial 136 is provided with a threaded bore which receives a set screw 138 to secure dial 136 and stem 134 against relative rotation. Dial 136 is formed with a central raised boss 140 with a screwdriver slot 142 formed in its upper face. Rotation of dial 136 increases or decreases the compression on spring 132 to thereby vary the pressure required to expand low limit chamber 44.

Mounted in compartment 30 against diaphragm 40 is a pressure plate 144 identical in construction to pressure plate 128. The pressure in high limit chamber 46 is controlled by a spring 146 and dial 148 similar in construction to springs 132 and dial 136, respectively.

Figure 8:
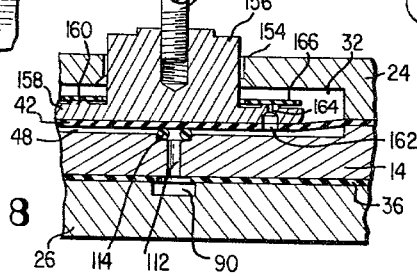
FIG. 8 is a sectional view taken on line 8—8 of FIG. 4.

Integrally formed on top plate 24 is a pair of raised supports 150 and 152 (FIG. 4). Formed between supports 150 and 152 in the upper wall of compartment 32 is an opening 154 (FIG. 8). Disposed against the upper side of operating diaphragm 42 is an operating member 156 which projects through opening 154.

Operating member 156 is provided with a lateral flange 158 having a raised annular rib 160 formed on its upper face. Diaphragm 42 is preferably adhesively secured to the lower face of flange 158 and coaxial openings 162 in diaphragm 42 and flange 158 communicate with a restricted bleed port 164 in rib 160. Concentrically disposed on operating plunger 156 is a bleed valve 166 in the form of an annular disc of resilient material which loosely overlies flange 158 and bleed port 164. When operating chamber 48 is expanded under fluid pressure, bleed valve 166 is compressed against the uper wall of compartment 32 to seal bleed port 164 (FIG. 8).

Mounted on supports 150 and 152 is a switch 168 which is secured to the supports by screws 170. Switch 168 has a movable actuating plunger 172 which is threadedly connected with operating member 156. Switch plunger 172 moves vertically relative to switch 168 to actuate the switch to on and off positions, or may alternately close two circuits controlled by switch 168. Mounted between switch 168 and operating member 156 is a spring 174 which biases operating member 156 downwardly to contract operating chamber 48 and move switch plunger 172 to its lower position. For connecting the switch with lead wires or terminals of the circuit controlled by switch 168, an internally threaded fitting 173 may be provided in the wall of the housing adjacent the switch.

Switch plunger 172 is actuated to its retracted position by introducing pressure into operating chamber 48 and remains in the retracted position as long as the pressure in the chamber 48 is sufficient to overcome spring 174. In order to determine the minimum pressure at which plunger 172 will be actuated to its upper position, low limit dial 136 is adjusted to provide a biasing force on diaphragm 38 that will maintain low limit chamber 44 contracted until the signal pressure reaches the desired low limit. Low limit dial 136 is provided with indicating markings on its upper face (FIG. 2) which cooperate with a boss 176, which is triangular in cross section, formed on dial plate 116 to indicate the pressure setting of the low limit chamber. A similar boss 178 is provided for high limit dial 148.

Cover member 18 is provided with openings 180 and 182 providing access to the slotted upper portion of low and high limit dials 136 and 148, respectively. Arcuate slots 184 and 186 overlie the upper face of low and high limit dials 136 and 148, respectively, and are provided with fixed indicating marks so that the pressure setting is indicated through the slots. Set screw 138 provides a means for calibrating the position of the dials on the stems of adjusting screws 124 and 126.

In operation, switch 168 may be connected to control the circuit of a compressor, pump or the like, or may control a circuit which is normally closed when the plunger 172 is in its extended position illustrated in FIGS. 4 and 8, and close a normally open circuit when the plunger is actuated toward the switch casing upon expansion of operating chamber 48. Actuation of the switch in response to variations in some condition being controlled, such as temperature, humidity or pressure, is accomplished by introducing a variable pressure signal to signal port 98, the variations in the pressure signal being in accordance with variations in the controlled condition.

To illustrate the operation, it may be assumed that when the signal pressure is less than 5 p.s.i., it is desired that plunger 172 be in the extended position, and that when the signal pressure is greater than 10 p.s.i., it is desired that plunger 172 be in its upper, or retracted position and remain in the retracted position when the signal pressure is between 5 and 10 p.s.i. The above values are illustrative only for purposes of description and are not to be construed in a limiting sense.

Low limit dial 136 is adjusted so that a signal pressure of 5 p.s.i. in low limit chamber 44 will cause diaphragm 38 to expand the chamber against the biasing force of low limit spring 132, an amount sufficient to permit exhaust valve 70 to close and disconnect chamber 44 from atmosphere. When the signal pressure increases slightly above the low limit setting (5 p.s.i. in this instance), passage 68 in control valve 56 is uncovered by diaphragm 38 and signal pressure flows through passage 68, grooves 66, channel 92 and inlet port 104 to high limit chamber 46. Signal pressure also flows through passage 90 to port 112 in the lower wall of operating chamber 48, but the engagement of diaphragm 42 with O-ring 114 prevents the pressure from port 112 from entering operating chamber 48.

High limit dial 148 is adjusted so that a pressure of 10 p.s.i. in high limit chamber 46 will cause diaphragm 40 to partially open port 106 against the biasing force of high limit spring 146. When the signal pressure is slightly above the high limit setting of 10 p.s.i., diaphragm 40 will move to open port 106 and the pressure in chamber 46 is transmitted through channel 94 to operating chamber 48. Bleed port 164 is too small to vent the pressure and operating chamber 48 begins to expand against spring 174. As soon as diaphragm 42 moves away from O-ring 114, port 112 is uncovered and chamber 48 is instantly simultaneously connected with the combined pressure from channels 94 and 90 which causes operating chamber 48 to expand with a rapid motion and snap actuate the switch plunger. In the expanded position disc valve 166 is compressed between the upper wall of compartment 32 and rib 160 to seal bleed port 164.

As the signal pressure decreases to the high limit setting, spring 146 forces diaphragm 40 to contract high limit chamber 46 and close port 106. When the signal pressure further decreases to the low setting, low limit spring 132 forces diaphragm 38 into engagement with control valve 56 to shut off the flow through passage 68 into chambers 46 and 48. Upon a slight additional decrease, spring 132 forces exhaust valve 50 away from valve seat 70 and the pressure is rapidly exhausted from channels 90 and 92 permitting switch plunger 172 to be extended with a snap action. As soon as operating member 156 is disengaged from the upper wall of compartment 32, any pressure trapped in channel 94 is vented through bleed port 164.

Ports 106 and 112 are sequentially opened to actuate the switch plunger to its retracted position, and upon decreasing signal pressure these ports are sequentially closed in the same order when the switch plunger is returned to its extended position. When port 112 is sealed by diaphragm 42, the small amount of area of diaphragm 42 which is exposed to the pressure in channel 90 is insufficient to provide a force sufficient to move diaphragm 42 against spring 174, and accordingly the pressure in channel 90 has no influence on operating member 156 until it is moved slightly away from O-ring 114 after which chamber 48 is simultaneously exposed to the combined pressures from channels 90 and 94. When the signal pressure subsequently decreases to less than the high limit setting, operating chamber 48 is under direct control of low limit chamber 44.

Figure 9:
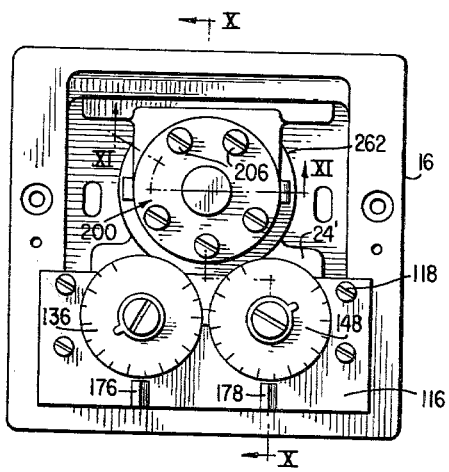
FIG. 9 is a plan view of a pressure actuated valve embodying a second form of the invention.
Figure 11:
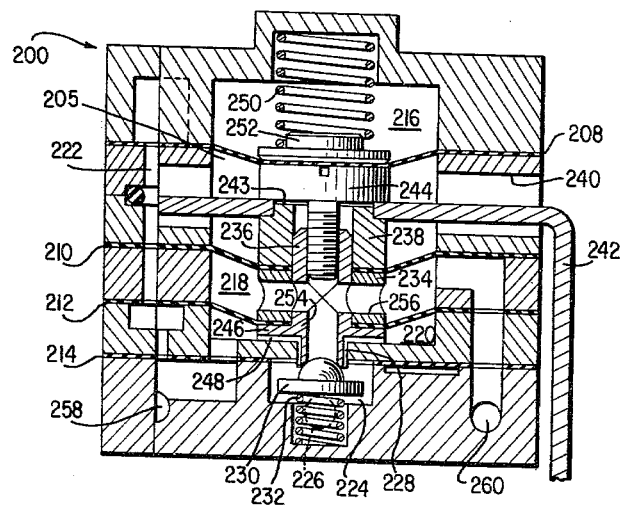
FIG. 11 is a sectional view of the valve body taken on line 11—11 of FIG. 9.
Figure 10:
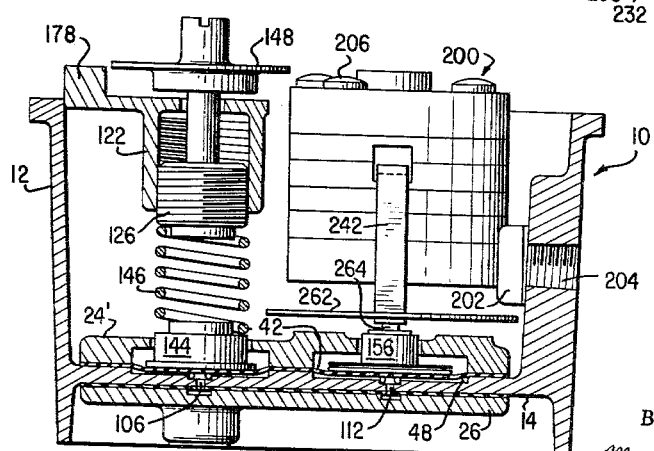
FIG. 10 is a sectional view taken on line 10—10 of FIG. 9.

FIGS. 9 through 11 illustrate the actuator connected to actuate a valve for controlling a fluid circuit. Structure identical to that previously described is identified by the same reference numerals. Supported on the right side wall of housing 10, as viewed in FIG. 10, is a valve body 200. Valve body 200 is secured to the housing by a fitting 202 which is integrally formed with valve body 200 and is provided with three ports which communicate with corresponding threaded ports in the wall of housing 10, one such port being indicated at 204.

Valve body 200 comprises a plurality of sections which are joined together by conventional screws 206, and which form a hollow cavity 205 in the valve body. Mounted in the valve body are three flexible diaphragms 208, 210, and 212, which, together with a resilient gasket 214, provide a fluid tight seal between the valve body sections.

Diaphragms 208, 210 and 212 are of equal effective areas and divide the interior of the valve body into a supply chamber 220, a balance chamber 216, and a normally closed delivery chamber 218. Supply chamber 220 and balance chamber 216 are connected by a passage 222 formed in the wall of valve body 200 so that the pressure acting upwardly on diaphragm 212 is balanced by the same pressure acting downwardly on diaphragm 208.

Formed in the lower wall of valve body 200 is a normally open delivery chamber 224 which communicates with an outlet port 226 in fitting 202, which in turn communicates with threaded port 204. Provided in the upper wall of chamber 224 is a port 228 communicating with chamber 220 which is controlled by a flanged hemispherical valve 230. Valve 230 is biased toward its closed position relative to port 228 by a spring 226 which is seated in a recess formed in the lower wall of chamber 224.

Mounted between diaphragms 210 and 212 is a centrally apertured spacer member 234 which receives an internally threaded portion of a valve stem 236 for actuating valve 230 and controlling communication between chamber 220 and chambers 218 and 224. Concentrically received on valve stem 236 on the upper side of diaphragm 210 is a sleeve member 238, and a slot 240 extends through the valve body for receiving one arm of a U-shaped actuating arm 242 which is apertured at 243 intermediate its ends for receiving the reduced upper portion of sleeve member 238. Threadedly connected with valve stem 236 is a screw 244 which cooperates with a flange 246 at the lower end of valve stem 236 to clamp the central portions of diaphragms 210 and 212 and actuating arm 242 together. Passages 248 are formed in flange 246 and the lower end of stem 236 so that when flange 246 is seated against the lower wall of chamber 220, a path for fluid flow is provided between chambers 220 and 224.

Mounted in balance chamber 216 is a spring 250 which has one end seated in a recess formed in the upper wall of chamber 216 and the other end seated against a spring plate 252 disposed against the upper side of diaphragm 208. Spring 250 acts through spring plate 252 and screw 244 to bias the central portions of the diaphragms in a downward direction causing valve stem 236 to unseat valve 230 and connect chamber 220 with chamber 224 and cause the diaphragms and actuating stem to move as a unit.

Formed in valve stem 236 is a passage 254 which communicates with chamber 218 through a horizontal passage 256 in spacer member 234. When valve stem 236 is moved upwardly against the bias of spring 250 from the position illustrated in FIG. 11, passages 254 and 256 connect chamber 218 with chamber 220, and valve 230 closes port 228 to shut off communication between chambers 220 and 224.

Chamber 220 communicates with a supply port 258 for connection with a source of constant pressure, and chamber 218 communicates with an outlet or delivery port 260. When stem 236 is in its lower position illustrated in FIG. 11, fluid flows from port 258 through port 228 to outlet port 226. Balance chamber 216 communicates with supply port 258 through passage 222 so that the pressure forces from supply port 258 acting on stem 236 are balanced. When stem 236 is shifted to its upper position, flow is diverted from port 226 to port 260.

Actuating arm 242 has its other horizontal arm disposed underneath valve body 200 (FIG. 10) and a plate member 262 is rotatably secured to the actuating arm. Extending downwardly from plate 262 is a threaded stem 264 which is engaged with operating member 156. Secured to the upper side of bottom wall 14 of housing 10 is a top plate member 24' which is identical with the previously described top plate 24 except that supports 150 and 152 are omitted. Rotation of plate member 262 adjusts the position of actuating arm 242 relative to operating member 156.

In operation, port 258 is connected to a constant pressure source and inlet 98 is connected with a variable pressure signal. Plate member 262 is rotated until diaphragm 42 in the operating chamber is contracted to the position closing port 112. When the signal pressure reaches the high limit value determined by spring 146, operating chamber 48 expands and moves valve stem 236 to its upper position to divert the flow from port 226 to port 260.

When the signal pressure decreases below the low limit value determined by spring 132, operating chamber 48 is exhausted and valve stem 236 returns to its lower position to divert the flow from port 260 back to port 226.

Figure 12:
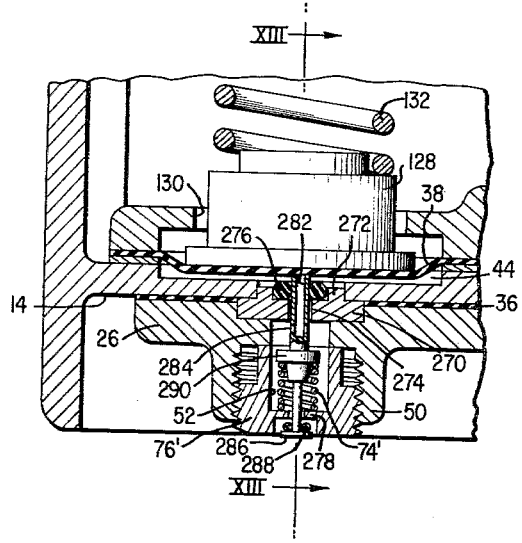
FIG. 12 is a fragmentary sectional view corresponding to a portion of FIG. 3 illustrating a second form of control valve embodying the invention.
Figure 13:
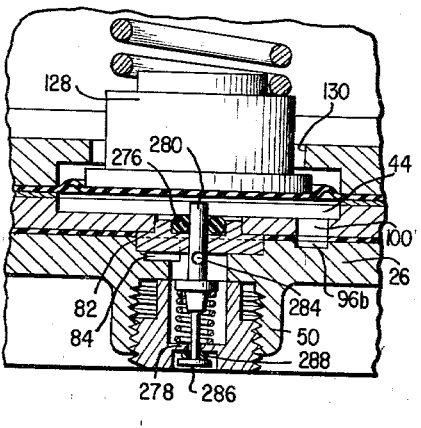
FIG. 13 is a sectional view taken on line 13—13 of FIG. 12.

FIGS. 12 and 13 illustrate the invention embodying a second form of control valve for alternately connecting high limit chamber 46 and operating chamber 48 with atmosphere and with low limit chamber 44. Mounted in recess 82 of base plate 26 is an annular plate member 270 having an annular shoulder 272 received in a corresponding opening in bottom wall 14. Shoulder 272 surrounds a centrally disposed opening 274 in plate member 270 and an O-ring 276 is seated in the recess formed by shoulder 272 and surrounds opening 274.

Threadedly mounted in the hollow boss 50 is a spring seat member 76' formed with an exhaust port surrounded by an exhaust valve seat 278. Slidably mounted in the exhaust port and in opening 274 is a valve stem 280 provided with a passage 282 in its upper end. Passage 282 communicates at one end with low limit chamber 44 and at its other end through apertures 284 with chamber 52. Formed on the lower end of valve stem 280 is a valve disc 286 which supports an O-ring 288 concentrically mounted on the valve stem. Valve spring 74' biases the valve stem in an upward direction toward the position illustrated in FIG. 13 to compress O-ring 288 between the valve seat 278 and disc 286 shutting off communication between chamber 52 and atmosphere. Spring 74' is supported between exhaust valve seat 278 and a shoulder 290 integrally formed on valve stem 280.

As shown in FIG. 12, when low limit chamber 44 is contracted by low limit spring 132, the upper end of passage 282 is sealed by diaphragm 38 and valve disc 286 is moved away from valve seat 278 to connect chamber 52 with atmosphere. Thus, high limit chamber 46 is in communication with atmosphere through port 106, and chamber 52, and operating chamber 48 is in communication with atmosphere through ports 112 and 108 and chamber 52.

When the pressure in low limit chamber 44 is sufficient to overcome spring 132, diaphragm 38 expands and spring 74' causes valve stem 280 to move to the closed position of FIG. 13 sealing the exhaust port and connect low limit chamber 44 with operating chamber 48 through channel 90 and port 112 and, also to connect low limit chamber 44 with the high limit chamber through channel 92 and port 104. O-ring 276 provides a fluid tight seal between low limit chamber 44 and chamber 52.

As soon as the pressure in low limit chamber 44 decreases to the value determined by the biasing force of spring 132, diaphragm 38 seals passage 282 and upon contraction of the low limit chamber, valve disc 286 is moved downwardly to open the exhaust port and release the pressure in channels 92 and 94 to atmosphere.

Figure 14:
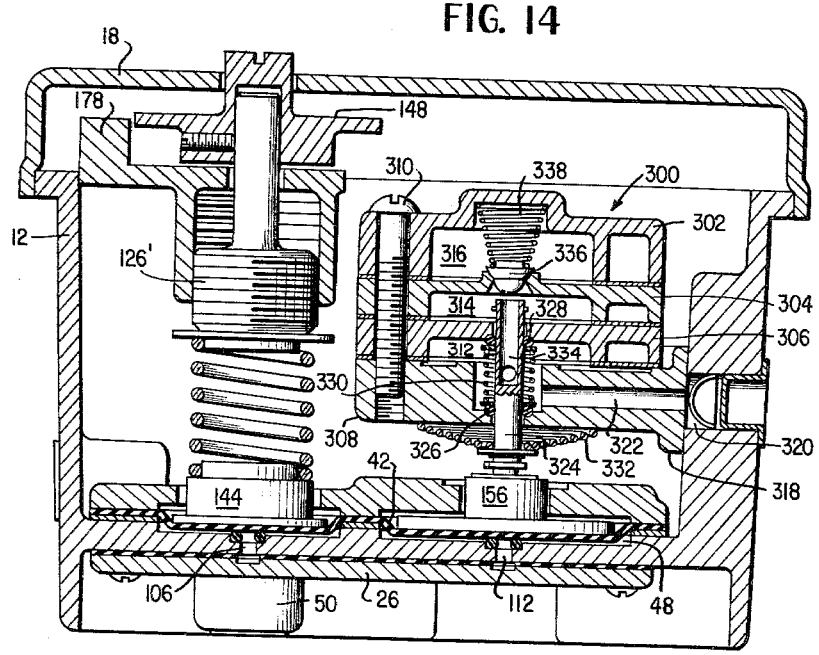
FIG. 14 is a sectional view similar to FIG. 10 illustrating another pressure actuated valve embodying the invention.

FIG. 14 illustrates a second form of valve connected to the actuator for controlling a fluid circuit. Supported on the side wall of housing 10 is a valve body 300 comprising a plurality of plate-like sections 302, 304, 306 and 308 joined together by screws 310 to form chambers 312, 314 and 316. Section 308 is provided with a fitting 318 formed with three ports, which communicate with corresponding ports in the wall of the housing one such port being indicated at 320. Port 320 communicates through a passage 322 with chamber 312, and the other two ports communicate respectively with chambers 314 and 316 through suitable passages (not shown).

Slidably supported in valve body 300 is a valve stem 324 which is secured to operating member 156 at its lower end. O-rings 326 and 328 provide a fluid tight seal between valve stem 324 and sections 308 and 306. O-rings 326 and 328 are held in position by a spring 330 mounted between suitable washers.

Operating member 156 is biased to contract operating chamber 48 by a spring 332 seated between the lower side of section 308 and a suitable shoulder formed on valve stem 324. Valve stem 324 has a passage 334 communicating at one end with chamber 314 and at its opposite end with chamber 312. Communication between chambers 316 and 314 is controlled by a valve 336 biased to its closed position by a spring 338 seated against the upper wall of the valve body.

In operation, the inlet of chamber 314 may be connected with a source of fluid at a constant pressure and inlet 98 of the actuator is connected with a variable signal pressure. When the signal pressure reaches the high limit value determined by spring 146, operating chamber 48 expands and moves valve stem 324 to its upper position to divert the flow from chamber 314 to chamber 316 and disconnect chamber 314 from chamber 312.

When the signal pressure decreases below the low limit value determined by spring 132, operating chamber 48 is exhausted to atmosphere and valve stem 324 returns to its lower position to divert the flow from chamber 316 to chamber 312.

While the invention has been described with reference to specific embodiments for purposes of illustration, it should be understood that the invention is not confined to the exact construction illustrated and that various modifications and alterations in the structure and arrangements of parts are possible without departing from the scope of the invention as defined by the appended claims.

What is claimed is:

1. A fluid pressure actuator comprising;
   a low limit chamber, a high limit chamber and an operating chamber each having a wall movable to expand and contract the chambers with each of the movable walls normally in the contracted position,
   means connecting the high limit chamber with the low limit chamber upon expansion of the low limit chamber,
   and means for connecting the operating chamber directly with both the low limit and high limit chambers upon expansion of the high limit chamber and for disconnecting only the high limit chamber from the operating chamber upon subsequent contraction of the high limit chamber.

2. A fluid pressure actuator comprising;
   a low limit chamber, a high limit chamber and an operating chamber each having a wall movable in response to pressure variations to expand and contract the chambers,
   means for connecting the low limit chamber with a variable signal pressure,
   means for contracting the chambers until the pressure in the low and high limit chambers reaches a low and high limit value, respectively,
   means for connecting the low limit chamber with the high limit chamber in response to expansion of the low limit chamber,
   and means for connecting the operating chamber directly with both the low and high limit chambers in response to expansion of the high limit chamber to expand the operating chamber and to thereafter disconnect the operating chamber from only the high limit chamber upon subsequent contraction of the high limit chamber,
   the operating chamber remaining in the expanded condition when the signal pressure is between the low and high limit values.

3. A fluid pressure actuator comprising;
   a low limit chamber, a high limit chamber and an operating chamber each having a wall movable in response to pressure variations to expand and contract the chambers,
   means for connecting the low limit chamber with a variable signal pressure,
   means for contracting the chambers until the signal pressure reaches selected low and high limit values to sequentially expand the low and high limit chambers, respectively,
   means connecting the low limit chamber with the high limit chamber upon expansion of the low limit chamber,
   and means for directly connecting the operating chamber substantially simultaneously with both the low and high limit chambers to expand the operating chamber in response to expansion of the high limit chamber, and to thereafter disconnect the operating chamber from only the high limit chamber upon subsequent contraction of the high limit chamber,
   said operating chamber remaining in the expanded condition when the signal pressure is between the selected low and high limit values.

4. A fluid pressure actuator as defined in claim 3 including;
   a bleed port in the movable wall of the operating chamber,
   an abutment overlying the operating chamber,
   and a bleed valve carried by the movable wall of the operating chamber engageable by the abutment upon expansion of the operating chamber to close the bleed port.

5. A fluid pressure actuator comprising;
   a low limit chamber, a high limit chamber and an operating chamber each having a wall movable to expand and contract the chambers,
   means biasing each of the movable walls to their contracted positions,
   a first normally closed port for connecting the high limit chamber with the low limit chamber in response to expansion of the low limit chamber,
   a second normally closed port for connecting the high limit chamber with the operating chamber when the high limit chamber is expanded,
   and a third normally closed port for connecting the low limit chamber with the operating chamber when the operating chamber is expanded.

6. Apparatus for controlling a variable condition between maximum and minimum values comprising;
   a control device having a movable actuating member,
   a low limit chamber, a high limit chamber and an operating chamber each having a pressure responsive wall movable to expand and contract the chambers,
   means operatively connecting the actuating member with the movable wall of the operating chamber,
   a first port connecting the low and high limit chambers,
   a second port connecting the high limit and operating chambers,
   a third port connecting the first port with the operating chamber,
   an exhaust port,
   a movable exhaust valve biased to close the exhaust port,
   a movable control valve engageable by the movable wall of the low limit chamber in its contracted position to open the exhaust valve and connect the first port with atmosphere,
   means biasing the low limit chamber to its contracted position,
   means biasing the movable wall of the high limit and operating chambers to their contracted positions to close the second and third ports, respectively, with the biasing force on the high limit movable wall greater than that on the movable wall of the low limit chamber,
   and an inlet for connecting the low limit chamber with a variable signal pressure for sequentially expanding the low limit, high limit and operating chambers as the signal pressure progressively increases above the values determined by the biasing forces on the low and high limit chambers to actuate the control device.

7. Apparatus as defined in claim 6 including;
a restricted bleed port in the movable wall of the operating chamber,
an abutment overlying the operating chamber,
and resilient bleed valve means mounted on the movable wall of the operating chamber engageable with said abutment upon expansion of the operating chamber to close the bleed port.

8. A fluid pressure actuator comprising;
a low limit chamber having a flexible wall movable in response to pressure variations to expand and contract the low limit chamber,
an exhaust port,
an exhaust valve controlling the exhaust port biased to close the exhaust port,
a low limit spring biasing the flexible wall to contract the low limit chamber,
a high limit chamber and an operating chamber each having a flexible wall for expanding and contracting the high limit and operating chambers in response to pressure variations,
an operating member engaged with the flexible wall of the operating chamber and movable upon expansion and contraction of the operating chamber,
a first port connecting the low limit chamber with the high limit chamber,
a hollow control valve flexibly mounted between the low limit chamber and exhaust port movable by the flexible wall to open the exhaust valve and connect the first port with atmosphere,
a second port controlled by the flexible wall of the high limit chamber connecting the high limit chamber with the operating chamber,
a third port controlled by the flexible wall of the operating chamber connecting the low limit chamber with the operating chamber,
a high limit spring biasing the flexible wall of the high limit chamber to contract the high limit chamber and seal the second port with a biasing force greater than that of the low limit spring,
means biasing the flexible wall of the operating chamber to contract the operating chamber and seal the third port,
and an inlet for connecting the low limit chamber with a variable signal pressure to sequentially expand the low limit, high limit and operating chambers as the signal pressure increases beyond low and high limit values as determined respectively by the bias of the low and high limit springs,
said operating chamber remaining in the expanded position when the signal pressure is between the low and high limits.

9. A pressure operated control device as defined in claim 8 comprising:
a flange on the operating member in engagement with the movable wall of the operating chamber,
an abutment overlying the operating chamber,
a bleed port in the movable wall of the operating chamber and extending through the flange,
and a resilient member carried by the operating member and overlying the bleed port engageable with the abutment for closing the bleed port when the operating chamber is in the expanded condition.

10. Apparatus for controlling a variable condition comprising;
a housing having a bottom wall,
a top plate member secured to the bottom wall and forming, first, second and third compartments,
a resilient gasket member mounted between the top plate and the bottom wall and having diaphragm portions forming movable walls for an expansible low limit chamber, high limit chamber and operating chamber in the first, second and third compartments, respectively,
an opening in the upper wall of the third compartment,
a flanged operating member seated against the movable wall of the operating chamber and reciprocally movable in the opening upon expansion and contraction of the operating chamber,
a control device mounted in the housing having a movable actuating member secured to the operating member,
a spring biasing the movable wall of the operating member to contract the operating chamber,
a first port controlled by the movable wall of the low limit chamber for connecting the low limit chamber with the high limit chamber in response to expansion of the low limit chamber,
a second port controlled by the movable wall of the high limit chamber for connecting the high limit chamber with the operating chamber in response to expansion of the high limit chamber,
a third port controlled by the movable wall of the operating chamber for connecting the low limit chamber with the operating chamber in response to expansion of the operating chamber,
means biasing the movable walls of the low and high limit chambers to their contracted positions with the biasing force on the movable wall of the high limit chamber greater than that on the movable wall of the low limit chamber,
and an inlet for connecting the low limit chamber with a variable signal pressure to sequentially expand the low limit, high limit and operating chambers as the signal pressure increases above low and high limit values determined by the biasing force on the movable walls of the low and high limit chambers, respectively, to actuate the control device.

11. Apparatus for controlling a variable condition as defined in claim 10 including;
a bleed port extending through the movable wall of the operating chamber and the flange of the operating member,
and a resilient annular bleed valve loosely received on the operating member and overlying the bleed port for engagement with the upper wall of the third compartment upon expansion of the operating chamber to close the bleed port.

12. Apparatus for controlling a variable condition between maximum and minimum values comprising;
a control device having a movable actuating member,
a low limit chamber, a high limit chamber and an operating chamber each having a pressure responsive wall movable to expand and contract the chambers,
means operatively connecting the actuating member with the movable wall of the operating chamber,
a first port connected with the high limit chamber,
a second port connecting the high limit and operating chambers,
a third port connecting the first port with the operating chamber,
valve means in the low limit chamber movable upon contraction of the low limit chamber to connect the first and third ports with atmosphere, and movable upon expansion of the low limit chamber to connect the first and third ports with the low limit chamber,
means biasing the movable wall of the low limit chamber to its contracted position,
means biasing the movable walls of the high limit and operating chambers to their contracted positions to close the second and third ports, respectively, with the biasing force on the high limit movable wall greater than that on the low limit movable wall, and an inlet for connecting the low limit chamber with a variable signal pressure for sequentially expanding the low limit, high limit and operating chambers as the signal pressure progressively increases above the values determined by the biasing forces on the low and high limit chambers to actuate the control device.

13. A fluid pressure actuator comprising;
a low limit chamber, a high limit chamber and an operating chamber,
a first port connecting the low limit chamber with the high limit chamber,
an exhaust port,
a valve stem slideably mounted in the exhaust port and low limit chamber,
an exhaust valve on one end of the valve stem for controlling communication between said first port and ambient atmosphere,
a valve spring biasing the exhaust valve to close the exhaust port,
a passage in the valve stem communicating at one end with the low limit chamber and at the other end with the first port,
a wall in the low limit chamber movable in response to pressure variations to expand and contract the low limit chamber, and operable upon contraction of the low limit chamber to close said one end of the passage and open the exhaust valve to connect the first port with atmosphere,
a wall for each of the high limit and operating chambers moveable in response to pressure variations to expand and contract said high limit and operating chambers,
a second port controlled by the moveable wall of the high limit chamber connecting the high limit chamber with the operating chamber,
a third port controlled by the movable wall of the operating chamber connecting the low limit chamber with the operating chamber,
an operating member connected with the moveable wall of the operating chamber for movement upon expansion and contraction of the operating chamber,
a low limit spring biasing the movable wall of the low limit chamber to its retracted position,
a high limit spring biasing the moveable wall of the high limit chamber to its retracted position to seal the second port,
said high limit spring exerting a biasing force greater than that of the low limit spring,
means biasing the flexible wall of the operating chamber to contract the operating chamber and seal the third port,
and an inlet for connecting the low limit chamber with a variable signal pressure to sequentially expand the low limit, high limit and operating chambers, as the signal pressure increases beyond low and high limit values as determined respectively by the bias of the low and high limit springs,
said operating chamber remaining in the expanded position when the signal pressure is between the low and high limits.

14. A fluid pressure actuator comprising;
a low limit chamber, a high limit chamber and an operating chamber each having a pressure responsive wall movable to expand and contract the chambers,
a first port connected with the high limit chamber,
a second port controlled by the moveable wall of the high limit chamber connecting the high limit and operating chambers,
a third port controlled by the movable wall of the operating chamber connecting the operating chamber with the first port,
an exhaust port,
valve means mounted between the exhaust port and low limit chamber movable by the movable wall of the low limit chamber to its contracted position to connect the first port with ambient atmosphere, and movable upon expansion of the low limit chamber to connect the first port with the low limit chamber,
means biasing the movable wall of the low limit chamber to its contracted position,
means biasing the movable walls of the high limit and operating chambers to their contracted positions to close the second and third ports, respectively, with a biasing force on the high limit movable wall greater than that on the low limit movable wall,
and an inlet for connecting the low limit chamber with a variable signal pressure for sequentially expanding the low limit, high limit and operating chambers as the signal pressure progressively increases above the values determined by the biasing forces on the low and high limit chambers.

15. A fluid pressure actuator comprising;
a low limit chamber, a high limit chamber and an operating chamber each having a pressure responsive wall movable to expand and contract the chambers,
a first port connected with the high limit chamber,
a second port controlled by the movable wall of the high limit chamber connecting the high limit and operating chambers,
a third port controlled by the movable wall of the operating chamber connecting the operating chamber with the first port,
an exhaust port,
a valve seat surrounding the exhaust port,
an outlet port in the low limit chamber,
a valve stem slidably mounted in the exhaust port and outlet port,
a disc formed on the end of the stem of the low limit chamber,
an O-ring received on the valve stem,
a spring biasing the stem to compress the O-ring between the valve seat and disc to close the exhaust port,
a passage in the valve stem communicating at one end with the low limit chamber and at the other end with the first port,
means biasing the movable wall of the low limit chamber to its contracted position to close said one end of the passage and open the exhaust port,
means biasing the movable walls of the high limit and operating chambers to their contracted positions to close the second and third ports, respectively, with the biasing force on the high limit movable wall greater than that on the low limit movable wall,
and an inlet for connecting the low limit chamber with a variable signal pressure for sequentially expanding the low limit, high limit and operating chambers as the signal pressure progressively increases above the values determined by the biasing force of the low and high limit chambers.

References Cited by the Examiner
UNITED STATES PATENTS

| 1,037,039 | 8/12 | Murphy | 91—25 |
| 1,169,304 | 1/16 | Turner | 91—433 |
| 1,169,305 | 1/16 | Turner | 91—433 |

FRED E. ENGELTHALER, *Primary Examiner.*
SAMUEL LEVINE, *Examiner.*